(12) United States Patent  
Kounlavong et al.

(10) Patent No.: US 7,942,094 B2
(45) Date of Patent: May 17, 2011

(54) FROZEN DRINK MAKER

(75) Inventors: Phetsouvanh Kounlavong, Boynton Beach, FL (US); Alejandro Pena, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 358 days.

(21) Appl. No.: 12/191,365

(22) Filed: Aug. 14, 2008

(65) Prior Publication Data

US 2010/0037786 A1    Feb. 18, 2010

(51) Int. Cl.
    *B02C 25/00*    (2006.01)
(52) U.S. Cl. .............. 99/486; 99/275; 99/300; 222/135; 222/146.6
(58) Field of Classification Search .............. 99/486, 99/275, 300, 484; 221/13; 241/285.2; 366/205, 366/144; 222/135, 146.6
See application file for complete search history.

(56) References Cited

U.S. PATENT DOCUMENTS

| 4,681,030 | A |   | 7/1987  | Herbert          |         |
|-----------|---|---|---------|------------------|---------|
| 5,323,691 | A | * | 6/1994  | Reese et al.     | 99/275  |
| 5,465,650 | A | * | 11/1995 | Friedrich et al. | 99/286  |
| 5,619,901 | A | * | 4/1997  | Reese et al.     | 99/275  |
| 5,960,701 | A | * | 10/1999 | Reese et al.     | 99/275  |
| 5,979,806 | A | * | 11/1999 | Borger et al.    | 241/37.5 |
| 6,012,660 | A | * | 1/2000  | Colman           | 241/30  |
| 6,342,260 | B2 | * | 1/2002  | Kolar et al.    | 426/231 |
| 7,231,142 | B1 |   | 6/2007  | Leung et al.    |         |
| 7,264,187 | B1 | * | 9/2007  | Kolar           | 241/30  |

* cited by examiner

*Primary Examiner* — M. Alexandra Elve
*Assistant Examiner* — John Wasaff
(74) *Attorney, Agent, or Firm* — Seth M. Blum

(57) ABSTRACT

A frozen drink maker is provided having an ice shaving unit with a rotatable ice chute. A plurality of blender units are positioned about the ice shaving unit, each having a removable blender jar for receiving shaved ice therein. A programmable controller is operably connected to the ice shaving unit and each of the blender units for controlling the operation of the ice shaving unit and the blender units. The programmable controller includes a plurality of preprogrammed routines to make a plurality of different frozen drink, wherein the programmable controller can be selectively set to make one of the plurality of frozen drink in each of the blender jars.

17 Claims, 13 Drawing Sheets

FROZEN DRINK MAKER

FIELD OF THE INVENTION

The present disclosure relates to apparatus for preparing frozen drinks, such as frozen soft drinks and cocktails, that consist of finely-divided ice, flavoring, and other ingredients.

BACKGROUND OF THE INVENTION

The popularity of "frozen drinks" such as margaritas has been increasing dramatically. Frozen drinks typically consist of a mixture of flavorings, liquor, and/or other ingredients and a finely-divided ice/water mixture that has the consistency of a thin paste. This type of drink is often called a "slush" drink because the consistency of the drink resembles its namesake in both viscosity and texture.

A frozen drink can be made by placing the ingredients of the drink, including ice in the form of cubes or crushed ice, in a blender. The blender is operated to mix the ingredients and reduce the ice to a finely-divided state. The mixture is then transferred to a drinking glass for consumption.

Alternatively, frozen drink makers as disclosed in U.S. Pat. No. 4,681,030 can be utilized. The '030 patent recites an apparatus for preparing frozen drinks having an ice-shaving machine combined with a blender. The ice-shaver and blender of the '030 patent are electrically wired together, and programmed to selective control of the periods of time over which the ice-shaver and blender operate. By the momentary activation of a single switch button, the apparatus may be activated and will automatically deliver the appropriate amount of ice to the blender cup and will turn on the blender at the appropriate time and for the appropriate amount of time.

SUMMARY OF THE INVENTION

The present invention provides a frozen drink maker including an ice shaving unit and a plurality of blender units positioned about the ice shaver unit. Each of the plurality of blender units has a removable blender jar for receiving shaved ice therein. A rotatable ice chute is included on the ice shaving unit, where the ice chute is selectively positionable over each of the blender jars for the deposition of shaved ice therein.

The frozen drink maker further includes a programmable controller operably connected to the ice shaving unit and each of the plurality of blender units. The programmable controller is configured to selectively control the operation of the ice shaving unit and each of the plurality of blender units. The programmable controller automatically controls the amount of ice deposited in each of the blender jars, as well as controlling the operational timing and duration of operation of the blender units. Additionally, the programmable controller automatically controls the rotation of the ice chute on the ice shaving unit for the depositing of shaved ice in the blender jars.

The programmable controller includes a plurality of preprogrammed operational routines for the ice shaving unit and the blender units for a plurality of different types of frozen drinks. A control panel is provided so that a user can select the type of frozen drink, if any, to be made in each of the plurality of blender jars.

Upon actuation of the start button, the programmable controller will automatically rotate the ice chute to a blender jar, and the ice shaving unit is activated for the deposit of shaved ice therein. Upon competition of the ice deposit, the programmable controller automatically rotates the ice chute to the next blender jar. The controller additionally activates the blender unit to mix the shaved ice and ingredients for a preprogrammed time period. This process is repeated for each of the plurality of blender jars. If one of the plurality of blender jars has no drink selection or no blender jar is present, the ice chute will skip over it, and the corresponding blender unit will not be activated.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE INVENTION

Figure 1:
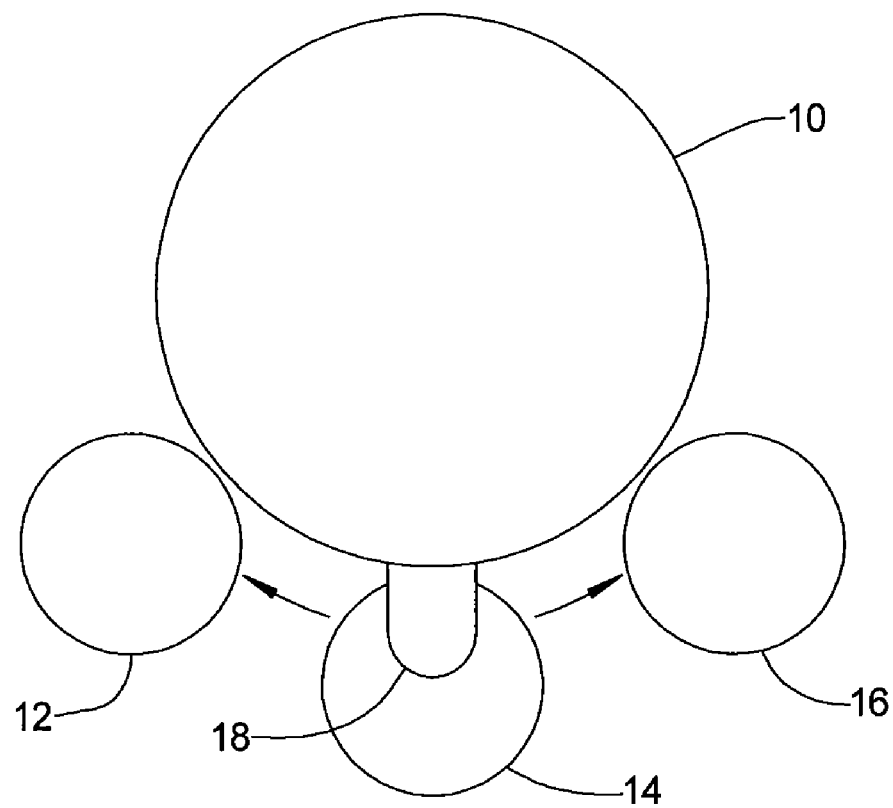
FIG. 1 depicts a schematic representation of a frozen drink maker of the present disclosure.
Figure 2:
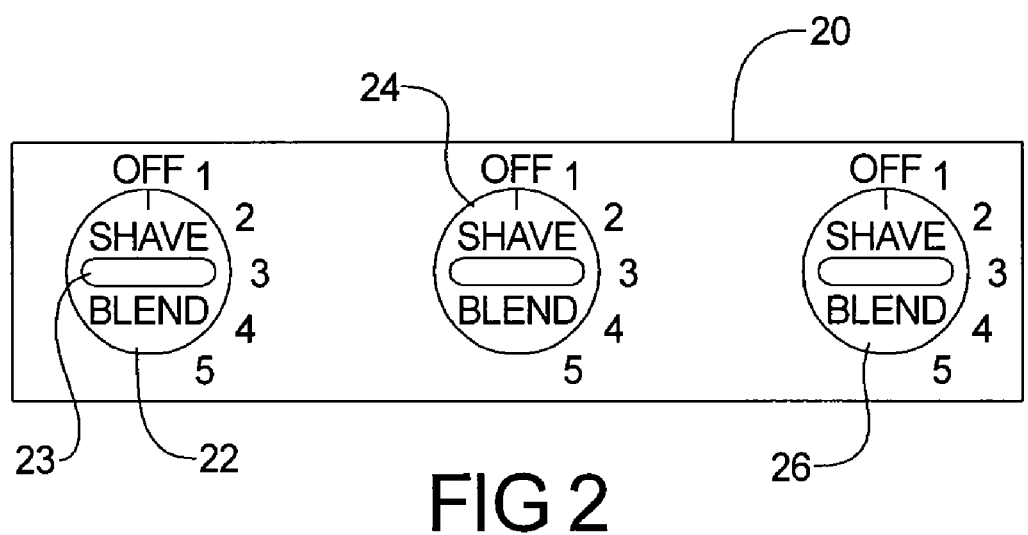
FIG. 2 depicts a schematic representation of a control panel for the frozen drink maker of the present disclosure.

The present disclosure provides a frozen drink maker having an ice-shaving unit combined with a multi-jar blender unit. The ice-shaving unit and multi-jar blender unit are wired together, and programmed to selective control the periods of time over which the ice-shaving unit and each of the individual blender units operate. Referring to FIGS. 1 and 2, the multi-jar blender unit can include three blender units 12, 14, 16, each having a blender jar spaced about the ice-shaving unit 10. A movable ice chute 18 is operably connected to the ice-shaving unit 10. The movable ice chute 18 is rotatable about the ice-shaving unit 10 in the clockwise and counter clockwise directions to selectively position and provide the appropriate quantity of shaved ice into each of the jars of the blender units 12, 14, 16.

The frozen drink maker can include a control processor configured and programmed so that ice shaving unit 10 and each of the individual blender units 12, 14, 16 can be individually controlled and operated. The frozen drink maker includes a control panel 20 having individual controls 22, 24, 26 for selective operation of the each of the blender units 12,

14, 16. Each of the controllers 22, 24 26 can be set from an initial "off" position to one of a plurality of preprogrammed frozen drink selections, which can include, for example, margaritas, daiquiris, smoothies, and the like.

In a method of use, a user places ice into the ice shaving unit 10. Ingredients for a frozen drink(s) to be made are placed in the jar(s) of the blender unit(s) 12, 14, or 16. The controller(s) 22, 24, 26 for each of the blender unit(s) 12, 14, or 16 is set to the type of drink to be made, and the frozen drink maker is activated. The ice chute 18 is selectively and sequentially rotated to the individual jar(s) of the blender unit(s) 12, 14, or 16 as provided by the controller(s) 22, 24, or 26 from an initial rest position. The rest position can be an initial positioning of the ice chute 18 over the jar of the second, center, blender unit 14. Once the ice chute 18 is in position, the ice-shaving unit 10 shaves the ice. This ice shaving unit 10 provides the appropriate amount of shaved ice into the individual jars(s). The individual blender unit(s) 12, 14, or 16 is operated to mix the ingredients and the shaved ice.

In a first example of use, only a first blender unit 12 is filled with ingredients. The user sets the first blender controller 22 to the desired drink. The controllers 24 and 26 of the second and third blender units 14, 16 remain in the "off" position. The activation of the frozen drink maker rotates the ice chute 18 from the rest position to the jar of the first blender unit 12 for the deposit of shaved ice therein. The preprogrammed routine turns on the first blender unit 12 at the appropriate time and for the appropriate duration to mix the ingredients and shaved ice within the jar. As the second and third blender controllers 24, 26 are in the "off" position, the ice chute 18 will not rotate to the jars of the second and third blender units 14, 16 for the deposit of ice therein, and these blender units remain "off." Upon completion, the ice chute 18 will return to the rest position.

In a second example of use, the first and second blender units 12, 14 are filled with ingredients. The user sets the first blender controller 22 to the desired frozen drink and the second blender controller 24 to the desired frozen drink. The first and second blender controllers 22, 24 can be set to the same or different drinks. The controller 26 of the third blender unit 16 remains in the "off" position. The activation of the frozen drink maker rotates the ice chute 18 from the rest position to the jar of the first blender unit 12 for the deposit of the shaved ice therein. The preprogrammed routine turns on the first blender unit 12 at the appropriate time and for the appropriate duration to mix the ingredients and shaved ice in the jar.

Upon completion of the ice deposit in the jar of the first blender unit 12, the ice chute 18 is rotated to the jar of the second blender unit 14 for the deposit of shaved ice therein. The preprogrammed routine turns on the second blender unit 14 at the appropriate time and for the appropriate duration to mix the ingredients and shaved ice in the jar. As the third blender controller 26 is in the "off" position, the ice chute 18 will not rotate to the jar of the third blender unit 16 and this blender unit remains "off." Upon completion, if the ice chute 18 is not in the rest position, the ice chute 18 will return to the rest position.

In a third example of use, the first, second, and third blender unit 12, 14, 16 are filled with ingredients. The user sets the first blender controller 22 to a desired drink, the second blender controller 24 to a desired drink, the third blender controller 26 to a desired drink. The first, second, and third blender controllers 22, 24, 26 can be set to the same or different drinks. The activation of the frozen drink maker rotates the ice chute 18 from the rest position to the jar of the first blender unit 12 for the deposit of shaved ice therein. The preprogrammed routine turns on the first blender unit 12 at the appropriate time and for the appropriate duration to mix the ingredients and shaved ice in the jar 12.

Upon completion of the ice deposit in the jar of the first blender unit 12, the ice chute 18 is rotated to the jar of the second blender unit 14 for the deposit of shaved ice therein. The preprogrammed routine turns on the second blender unit 14 at the appropriate time and for the appropriate duration to mix the ingredients and shaved ice in the jar.

Upon completion of the ice deposit in the jar of the second blender unit 14, the ice chute 18 is rotated to the jar of the third blender unit 16 for the deposit of shaved ice therein. The preprogrammed routine turns on the third blender unit 16 at the appropriate time and for the appropriate duration to mix the ingredients and shaved ice in the jar. Upon completion, if the ice chute 18 is not in the rest position, the ice chute 18 will return to the rest position.

In all of the above examples, a blender jar must be positioned on the blender unit 12, 14, or 16 for the ice chute 18 to rotate to the selected blender unit 12, 14, or 16. If no blender jar is present on a specific blender unit 12, 14, or 16, the ice chute 18 will not rotate to that blender unit 12, 14, or 16, and that blender unit will not be activated.

The above examples are only exemplary in nature, and it is envisioned that any combination of a single or multiple blender units 12, 14, or 16 can be utilized.

Each of the controllers 22, 24, 26 can further include a switch for manual operation of the ice shaving unit 10 and each of the respective blender units 12, 14, 16. For example, a toggle switch 23 can be provided on each of the controllers 22, 24, 26. The toggle switch 23 can be actuated to manually operate a blender unit 12, 14, or 16 in either a blender only or ice shave only mode. The toggle switch 23 can be biased in a neutral position, such that the switch 23 needs to be actuated and held in either of the manual operative positions.

In an exemplary use, to perform a manual blend or shaving operation, the respective toggle switch is first actuated for an initial time period, for example 5 seconds. The first actuation of the switch calls the ice chute 18 from the rest position and the ice chute 18 is rotated to the respective blender unit 12, 14, or 16. The manual operation can then be activated. Upon completion of the manual operation, the ice chute 18 will automatically rotate back to the rest position after a specified time period, for example 10 seconds.

Figure 3:
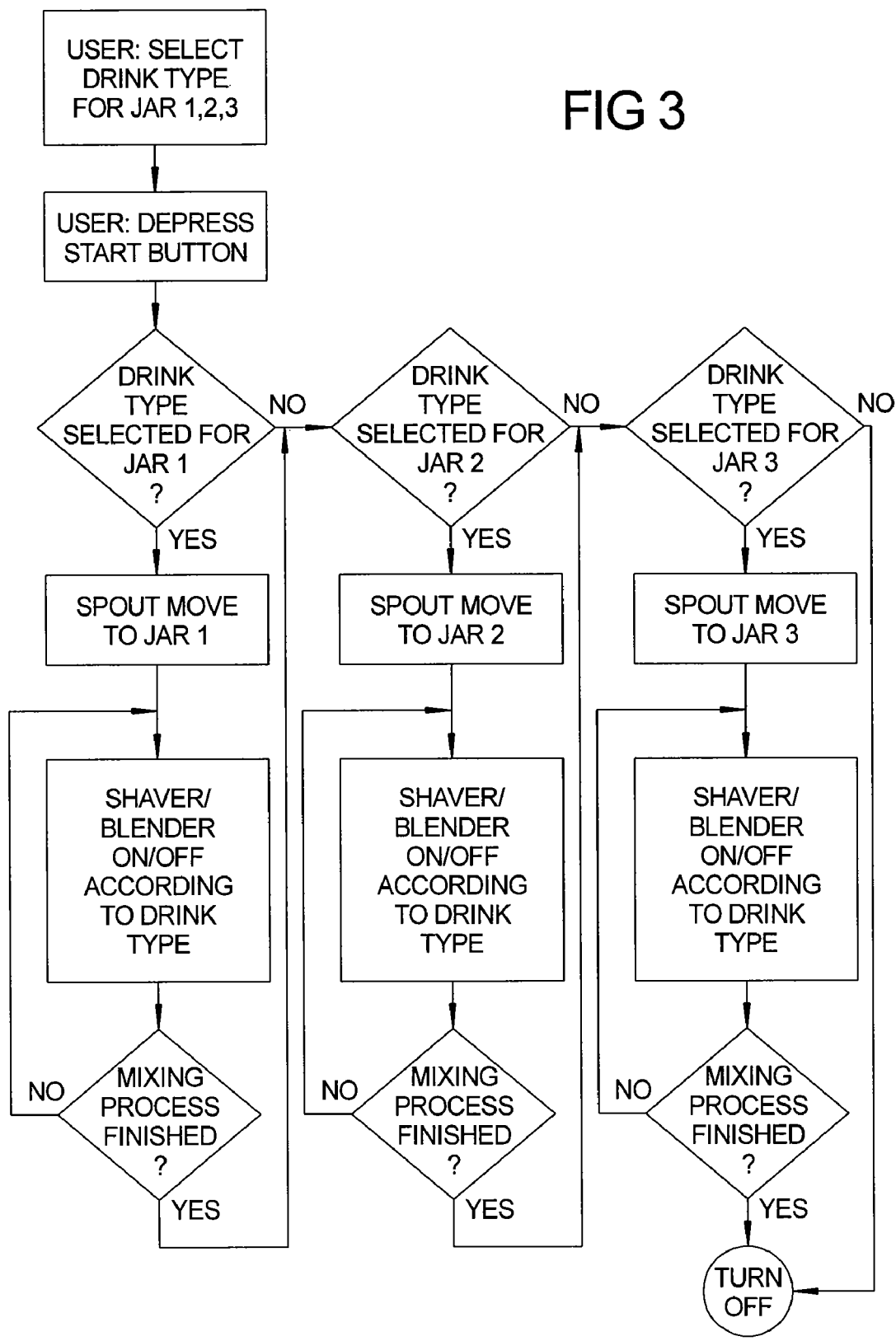
FIG. 3 depicts a flow chart of an exemplary control routine.

FIG. 3 illustrates a programmed control routine of the frozen drink maker. Automated control is achieved by a programmable control processor connected to the various inputs and outputs of the frozen drinker maker. A user selects a drink type on the controller 22, 24, 26 for the first, second, and/or third blender units 12, 14, 16. The user depresses a start button to initiate the program.

The status of the first blender unit 12 is checked. If a blender jar is present on the first blender unit 12 and the user selected a drink type for the first blender unit 12, the ice chute 18 is positioned over the jar of the first blender unit 12 from the rest position. If no blender jar is present on the first blender unit 12 or no drink type was selected, the ice chute 18 will not be positioned over the first blender unit 12 and the first blender unit 12 will not operate. The ice shaving unit 10 and first blender unit 12 are operated in accordance with the drink type. The operation of the ice shaving unit 10 continues until the appropriate amount of ice is deposited in the blender jar. The first blender unit 12 continues until the mixing process is complete.

Upon complete of the mixing process for the first blender unit 12 or if no blender jar is on or no drink type was selected for the first blender unit 12, the status of the second blender unit 14 is checked. If a blender jar is present on the second blender unit 14 and the user selected a drink type for the second blender unit 14, the ice chute 18 is positioned over the blender jar of the second blender unit 14 from the ice chute's 18 last position or the rest position. If no blender jar is present on the second blender unit 14 or no drink type was selected, the ice chute 18 will not be positioned over the second blender unit 14 and the second blender unit 14 will not operate. The ice shaving unit 10 and second blender unit 14 are operated in accordance with the drink type. The operation of the ice shaving unit 10 continues until the appropriate amount of ice is deposited in the blender jar. The second blender unit 14 continues until the mixing process is complete.

Upon complete of the mixing process for the second blender unit 14 or if no blender jar is on or no drink type was selected for the second blender unit 14, the status of the third blender unit 16 is checked. If no blender jar is present on the third blender unit 16 or no drink type was selected, the ice chute 18 will not be positioned over the third blender unit 16 and the third blender unit 16 will not operate. If the user selected a drink type for the third blender unit 16 and a jar is in place, the ice chute 18 is positioned over the third blender unit 16 from the ice chute's 18 last position or the rest position. The ice shaving unit 10 and third blender unit 16 are operated in accordance with the drink type. The operation of the ice shaving unit 10 continues until the appropriate amount of ice is deposited in the blender jar. The third blender unit 16 continues until the mixing process is complete.

Upon complete of the mixing process for the third blender unit 16 or if no drink type was selected for the third blender unit 16, the ice chute 18 will return to the rest position after a specified time period, for example 10 seconds.

Figure 4:
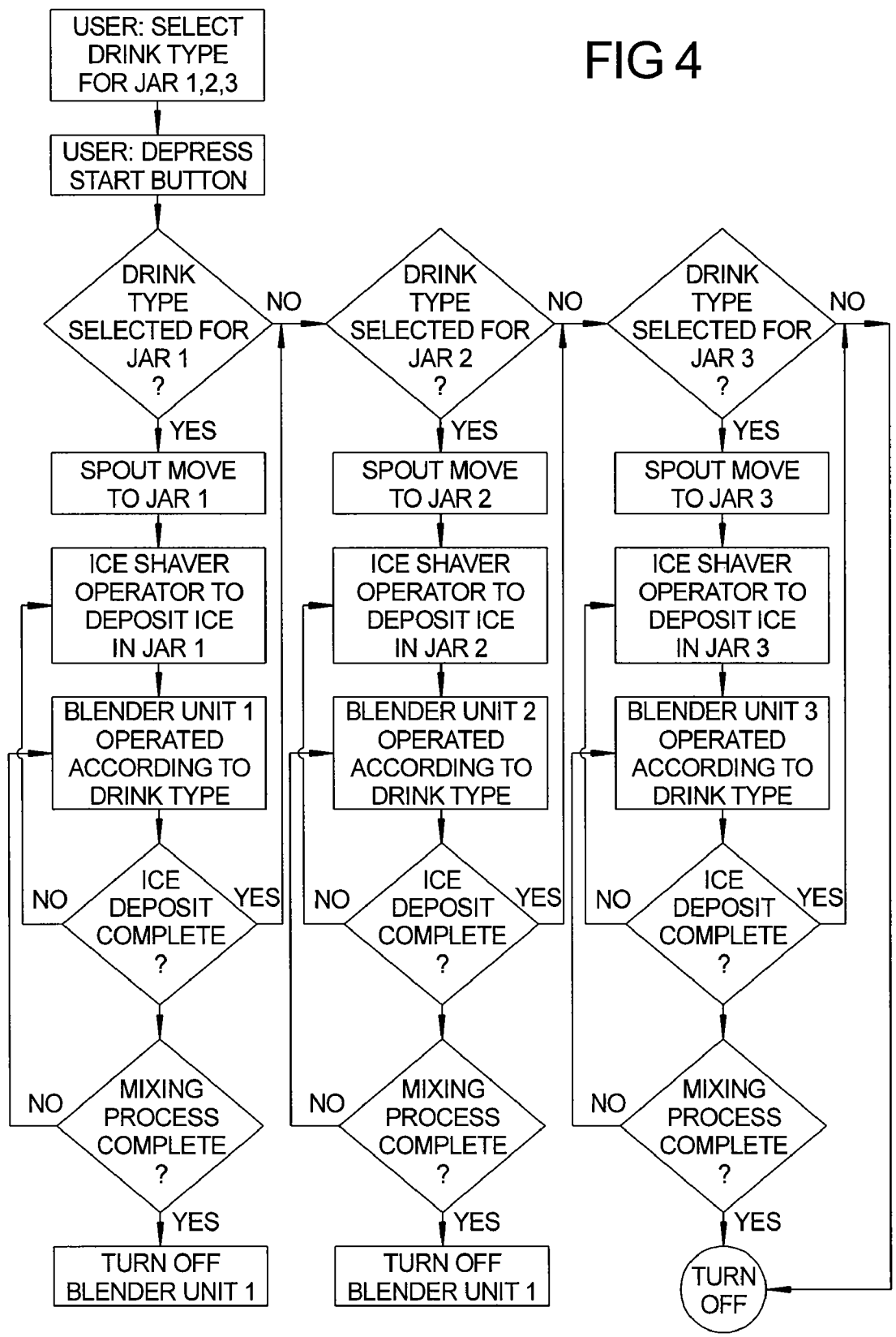
FIG. 4 depicts a flow chart of another exemplary control routine.

In the above description it is noted that the ice shaving unit 10 and blender unit 12, 14, 16 programs are performed consecutively. However, it is envisioned that the ice shaving machine and blender unit programs can be performed concurrently and consecutively. Referring to FIG. 4 a user selects a drink type on the controller 22, 24, 26 for the first, second, and/or third blender units 12, 14, 16. The user depresses a start button to initiate the program.

The status of the first blender unit 12 is checked. If the user selected a drink type for the first blender unit 12 and a jar is in place, the ice chute 18 is positioned over the blender jar of the first blender unit 12 from the rest position. The ice shaving unit 10 is operated in accordance with the drink type and begins to deposit the shaved ice. After a predetermined time, the first blender unit 12 is operated. Upon completion of the ice deposit in the blender jar of the first blender unit 12, the second blender unit 14 is checked. The operation first blender unit 12 continues until the mixing process is complete.

Upon complete of the ice deposit for the first blender unit 12 or if no drink type was selected for the first blender unit 12, the status of the second blender unit 14 is checked. If the user selected a drink type for the second blender unit 14 and a jar is in place, the ice chute 18 is positioned over the blender jar of the second blender unit 14 from the ice chute's 18 last position or the rest position. The ice shaving unit 10 is operated in accordance with the drink type and begins to deposit the shaved ice. After a predetermined time, the second blender unit 14 is operated. Upon completion of the ice deposit in the blender jar of the second blender unit 14, the third blender unit 16 is checked. The operation of the second blender unit 14 continues until the mixing process is complete.

Upon complete of the ice deposit for the second blender unit 14 or if no drink type was selected for the second blender unit 14, the status of the third blender unit 16 is checked. If the user selected a drink type for the third blender unit 16 and a jar is in place, the ice chute 18 is positioned over the blender jar of the third blender unit 16 from the ice chute's 18 last position or the rest position. The ice shaving unit 10 is operated in accordance with the drink type and begins to deposit the shaved ice. After a predetermined time, the third blender unit 16 is operated. Upon completion of the ice deposit in the blender jar of the third blender unit 16, the ice shaver is shut off. The operation of the third blender unit 16 continues until the mixing process is complete. Upon complete of the mixing process for the third blender unit 16 or if no drink type was selected for the third blender unit 16, the ice chute 18 will return to the rest position after a specified time period, for example 10 seconds.

Figure 5:
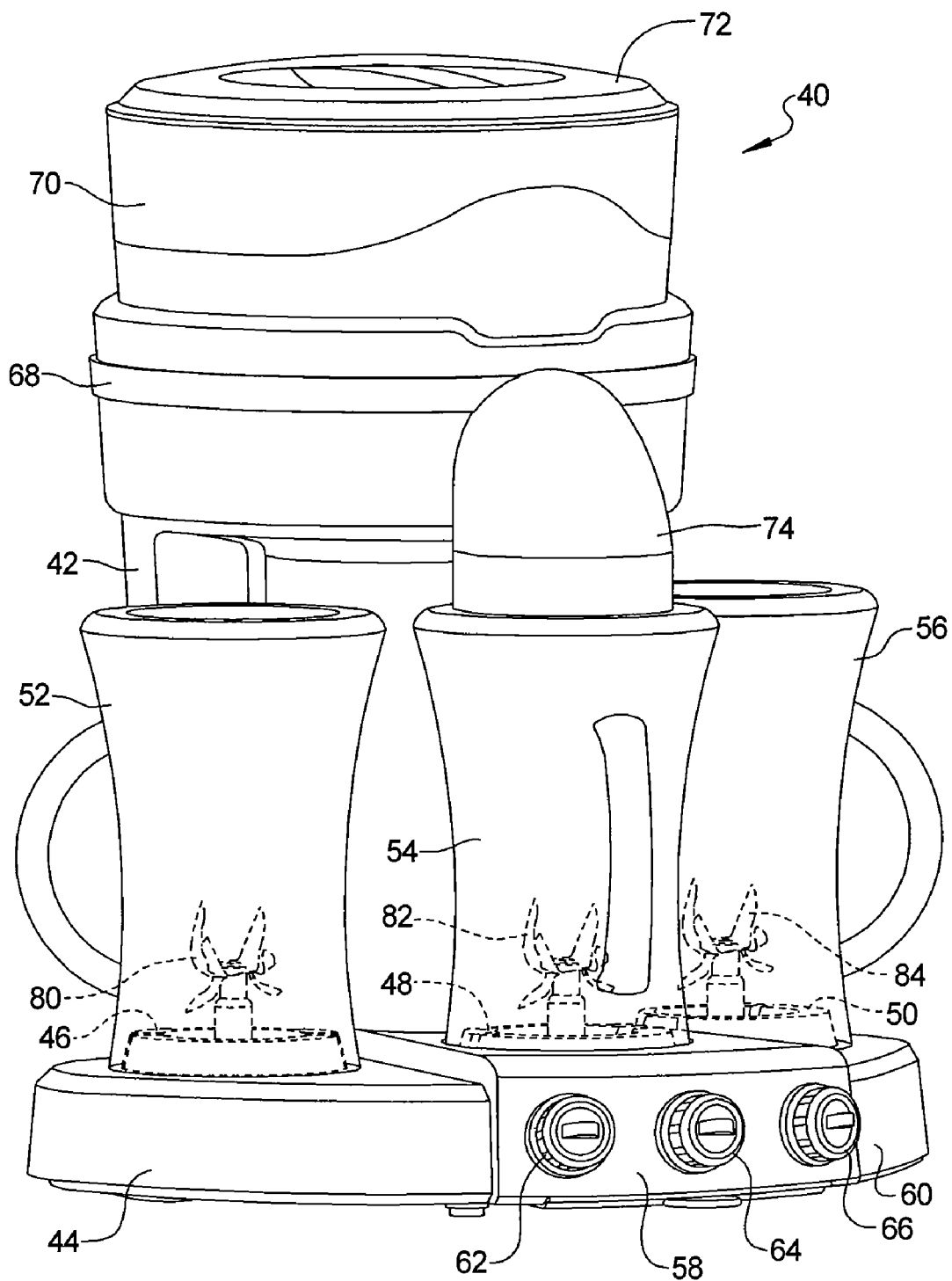
FIG. 5 depicts a front isometric view of a frozen drink maker of the present disclosure.
Figure 6:
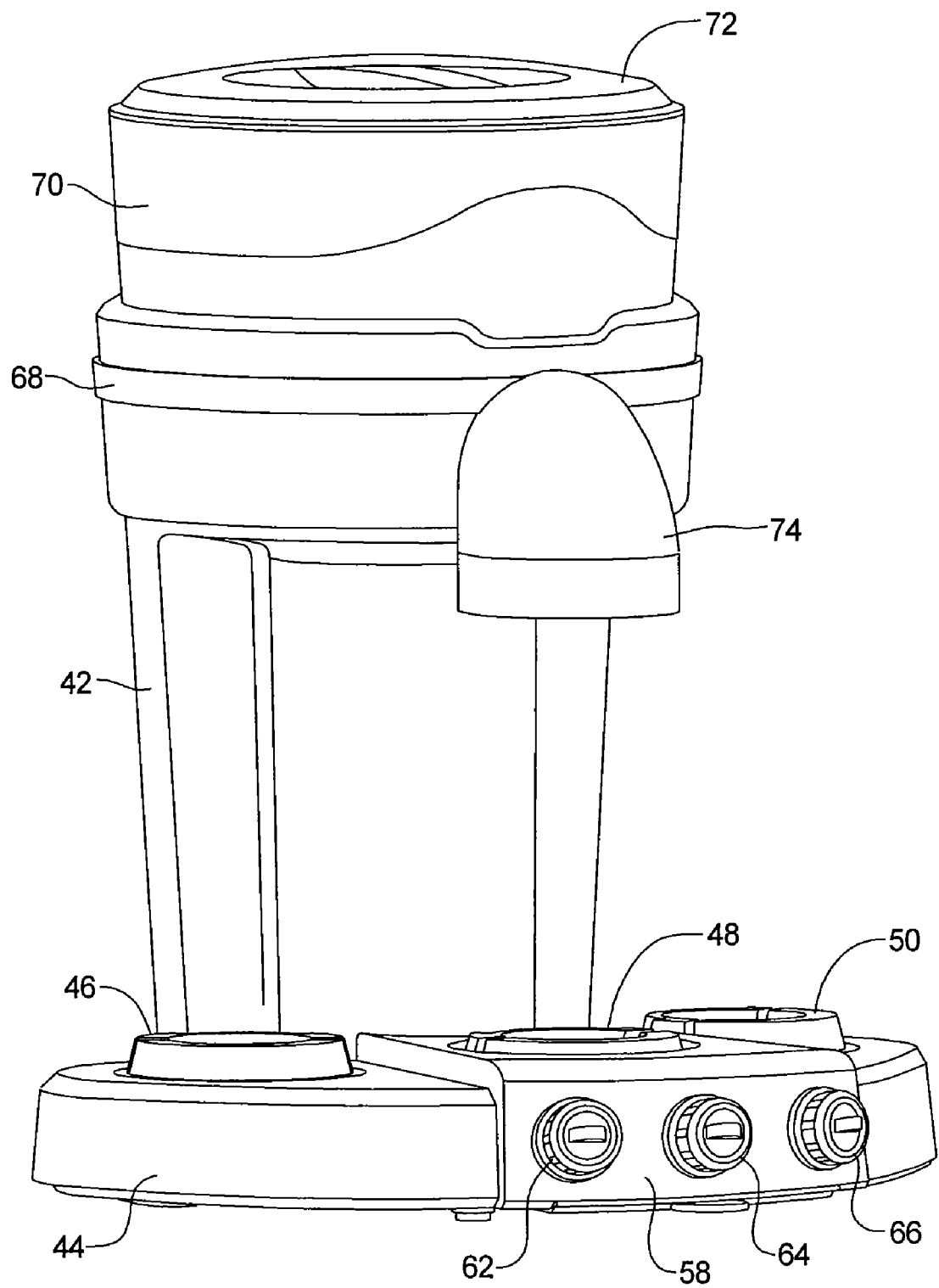
FIG. 6 depicts a front isometric view of the frozen drink maker of FIG. 5 without the blender jars.

Referring now to the drawing figures in which like reference designators refer to like elements, there is shown in FIGS. 5 and 6 an exemplary frozen drink maker 40 of the present disclosure. The frozen drink maker 40 includes a housing 42 vertically connected to a base 44. The base 44 has three individual blender units 46, 48, and 50 on which blender jars 52, 54, and 56 can be removably positioned. A control panel 58 is provided on a front surface 60 of the base 44 and includes separate controllers 62, 64, and 66 for each of the blender units 46, 48, and 50.

The blender units 46, 48, 50 can include a sensor to determining if a blender jar is present on each of the blender units 46, 48, 50. Indicator lights can be provided on the control panel 58, adjacent to each of the controllers 62, 64, 66, for indicating whether or not a blender jar is present on the blender units 46, 48, 50. The lack of blender jar on a blender unit 46, 48, 50 prevents the operation of the respective blender unit 46, 48, 50. Additionally, the sensor can likewise be used to indicate if a blender jar is not seated correctly on a blender unit 46, 48, 50, which would similarly prevent operation of the respective blender unit 46, 48, 50.

The housing 42 is vertically positioned on the base 44, and includes an ice shaving unit 68 having a refillable ice container 70 and a removable cover 72. A movable ice chute 74 is in fluid communication with the ice shaving unit 68, such that the movable ice chute 74 can be selectively positioned over a blender jar 52, 54, or 56 for the deposition of shaved ice therein.

A processor is configured and programmed so that the ice shaving unit 68 and each of the individual blender units 46, 48, 50 can be individually controlled and operated. The individual controllers 62, 64, and 66 for each the blender units 46, 48, and 50 allow for individual selection of a preprogrammed routine for each of the blender units 46, 48, and 50. Each of the controllers 46, 48, and 50 can be set from an initial "off" position or to one of a plurality of preprogrammed frozen drink selections, which can include, for example, margaritas, daiquiris, smoothies, and the like.

Figure 7:
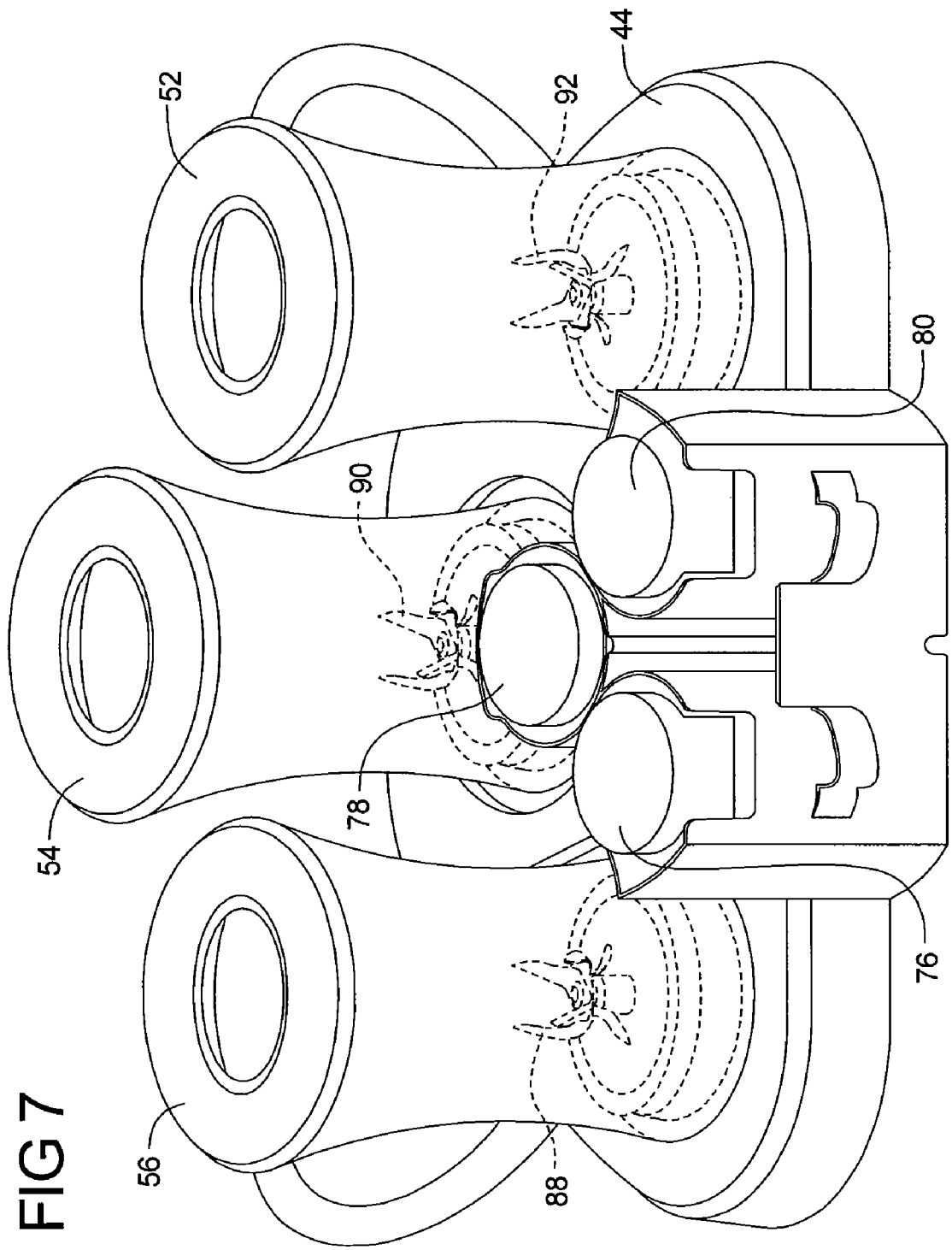
FIG. 7 depicts a top back sectional isometric view of the base of the frozen drink maker of FIG. 5.
Figure 8:
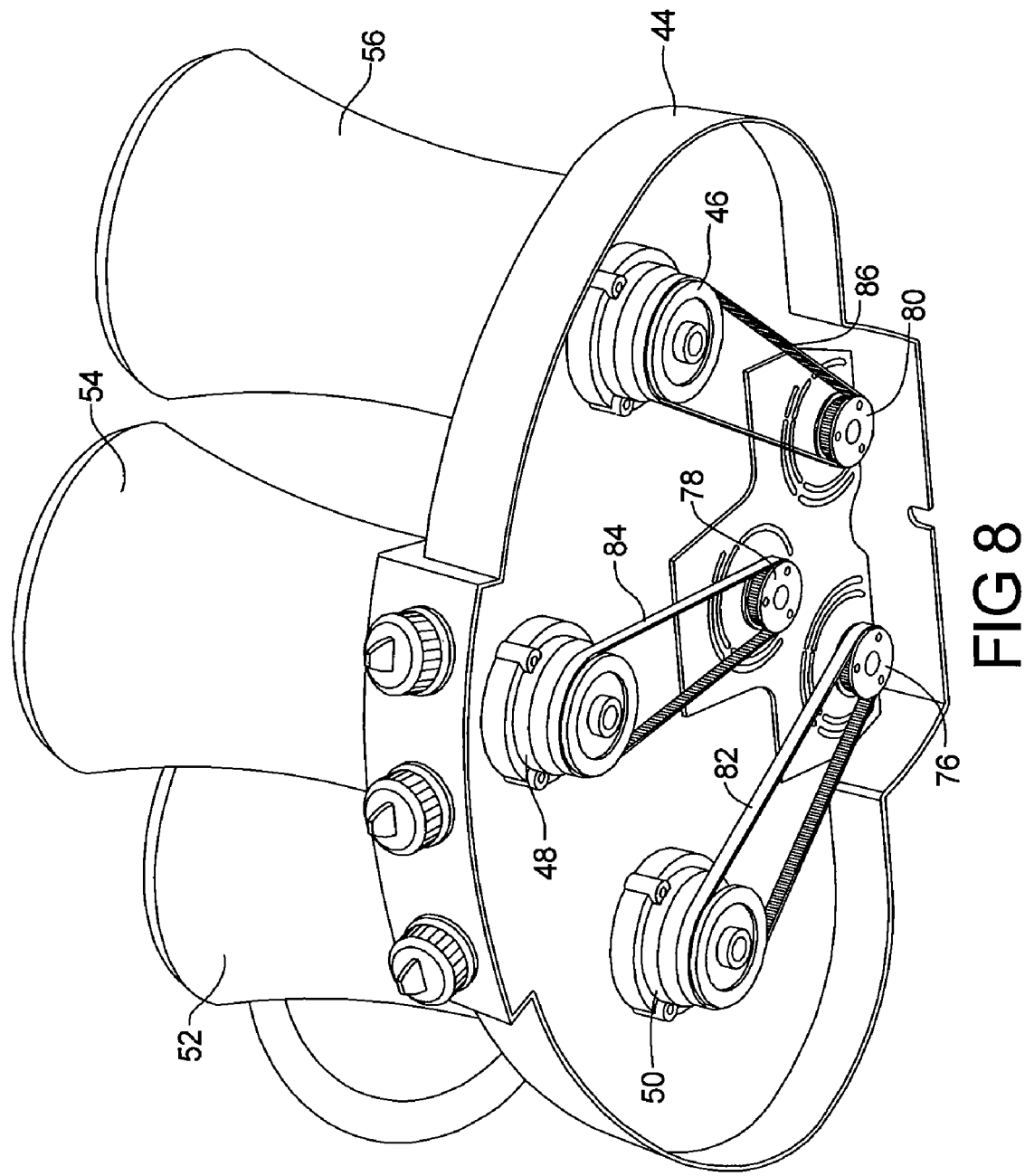
FIG. 8 depicts a bottom sectional isometric view of the base of the frozen drink maker of FIG. 5.

Referring to FIGS. 7 and 8, drive motors 76, 78, 80 are partially positioned in the housing 42 and extending through the base 44 for operation of the blender units 46, 48, 50. One of each drive motor 76, 78, 80 is provided for each of the blender units 46, 48, and 50, where drive belts 82, 84, 86 operably connect each of the drive motors 76, 78, 80 to a respective blender unit 46, 48, and 50. Operation of the drive motors 76, 78, 80 is controlled by the controllers 62, 64, 66 on the control panel 58, one each controller 62, 64, 66 is connected to a drive motor 76, 78, 80. The drive motors 76, 78, 80 can be single direction motors for rotating the blender blades 80, 82, 84 in each of the blender jars 52, 54, and 56 in a single direction. Alternatively, the drive motors 76, 78, 80 can be bi-directional drive motors, to selectively rotate the blades 88, 90, 92 in the blender jars 52, 54, 56 in either the clockwise or counter-clock wise direction in accordance with a preprogrammed mixing routine.

Alternatively, the frozen drink maker 40 can include a single drive motor. The single drive motor can be operably connected to each of the blender units 46, 48, 50 to selectively drive each of the blender units 46, 48, 50 separately or in combination. The single drive motor can be connected to each of the blender units utilizing drive belts, gears, or combinations thereof.

Figure 9:
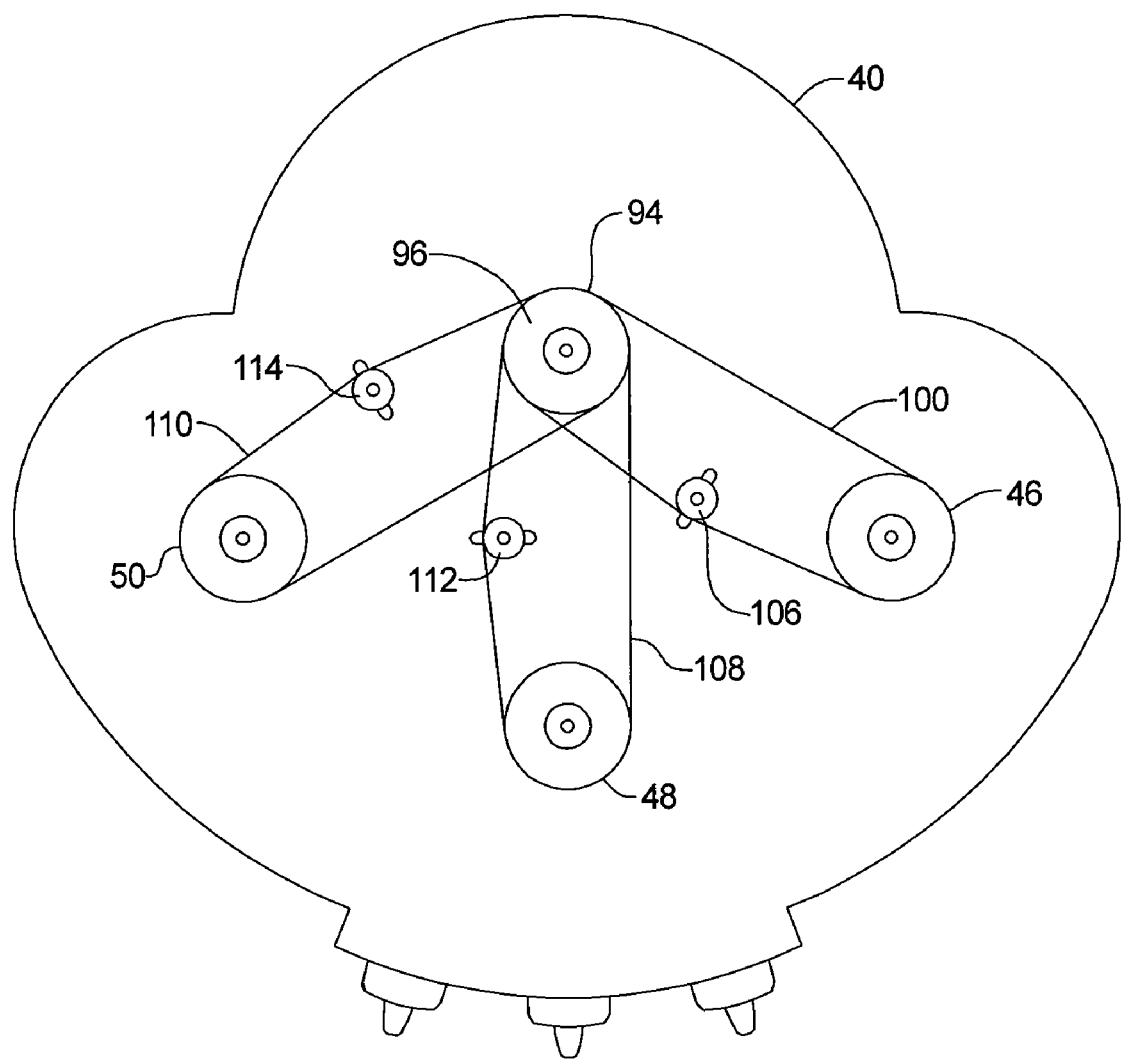
FIG. 9 depicts a bottom view of a single motor drive system for the frozen drink maker of FIG. 5.
Figure 10:
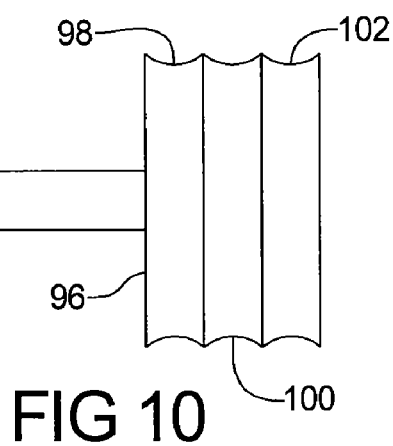
FIG. 10 depicts a main drive pulley for the single drive motor of FIG. 9.

Referring to FIGS. 9 and 10, the frozen drink maker 40 includes a single drive motor 94 operably connected to each of the blender units 46, 48, 50. The drive motor 94 includes a main drive pulley 96 having three pulley sections, 98, 100, 102, each of which is configured to receive a drive belt thereabout.

A first drive belt 104 is connected about a first pulley section 98, operably connecting the first blender unit 46 to the drive motor 94. A tensioning pulley 106 is provided along the first drive belt 104 to increase and decrease the tension in the first drive belt 104. In an untensioned positioned, the first drive belt 104 is substantially slack about the main drive pulley 96, such that a rotation of the main drive pulley 96 fails to engage and drive the first drive belt 104. In a tensioned position, the tensioning pulley 106 is actuated to increase the tension in the first drive belt 104. In this configuration, the first drive belt 104 engages the main drive pulley 96, such that the first drive belt 104 is rotated by the main drive pulley 96 to drive the first blender unit 46.

Similarly, second and third drive belts 108, 110 operably connect the second and third blender units 48, 50 to the main drive pulley 96, where the second drive belt 108 is positioned about the second pulley section 100, and the third drive belt 110 is positioned about the third pulley section 102 of the main drive pulley 96. Tensioning pulleys 112, 114 are provided along the second and third drive belts 108, 110 to increase and decrease the tension in the second and third drive belts 108, 110, to selectively drive the second and third blender units 48, 50. In this manner, the first, second, and third blender units 46, 48, and 50 can be selectively operated, either alone or in combination, in accordance with a selected routine.

The single drive motor 94 can be a single direction motor for rotating the blender blades 88, 90, 92 in each of the blender jars 52, 54, and 56 in a single direction. Alternatively, the single drive motor 94 can be a bi-directional drive motor, to selectively rotate the blades 88, 90, 92 in the blender jars 52, 54, 56 in either the clockwise or counter-clock wise direction in accordance with a preprogrammed mixing routine.

The above multi and single drive motor are described as being indirectly connected to the individual blender units. The indirect connections can being made utilizing drive belts, gears, or combinations thereof. It is also envisioned that the drive motors can be directly connected to the blender units, where a drive shaft of a drive motor can be directly linked to a blender unit.

Figure 11:
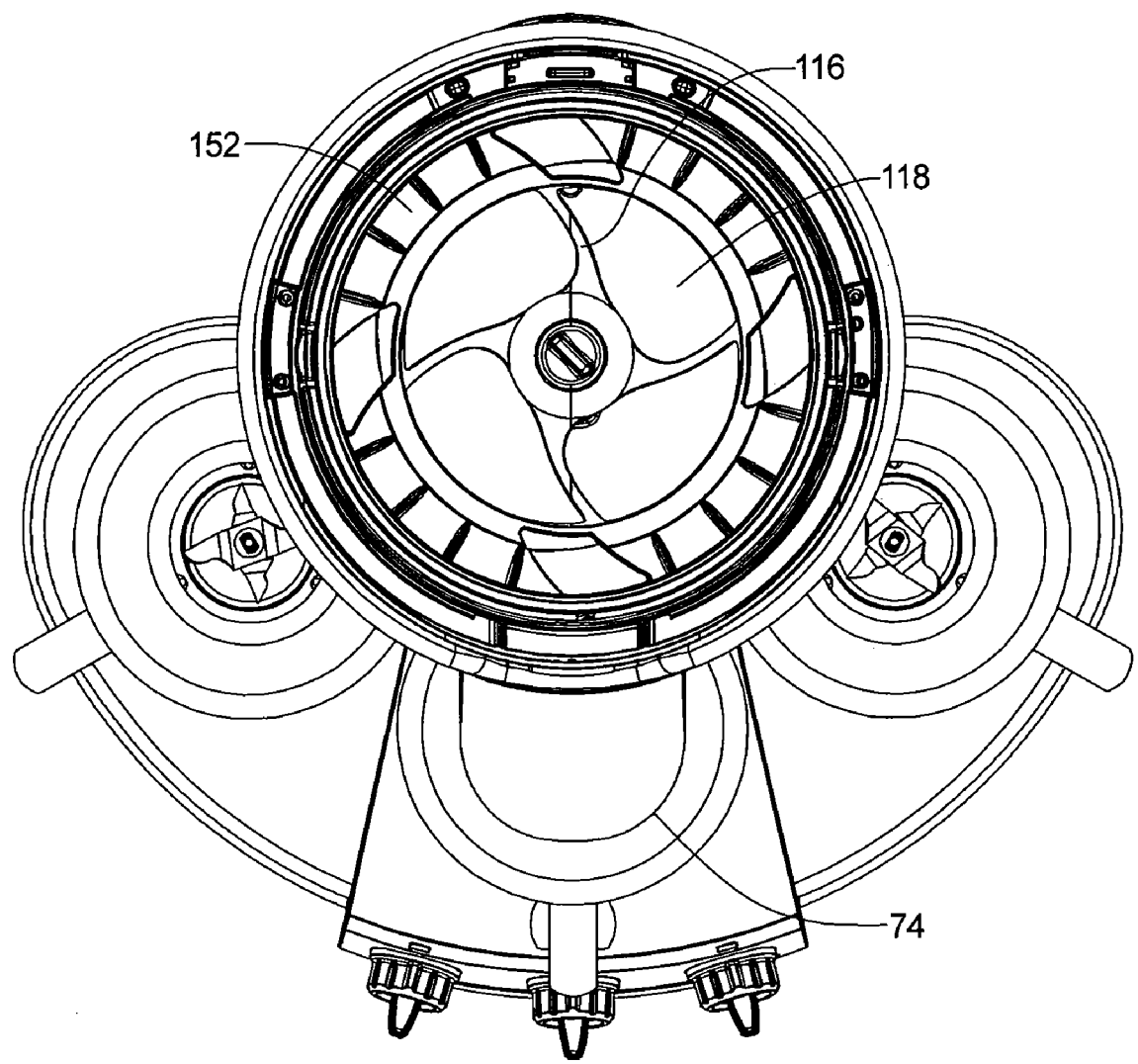
FIG. 11 depicts a top sectional view of the frozen drink maker of FIG. 5, showing the ice paddles and ice hopper.
Figure 12:
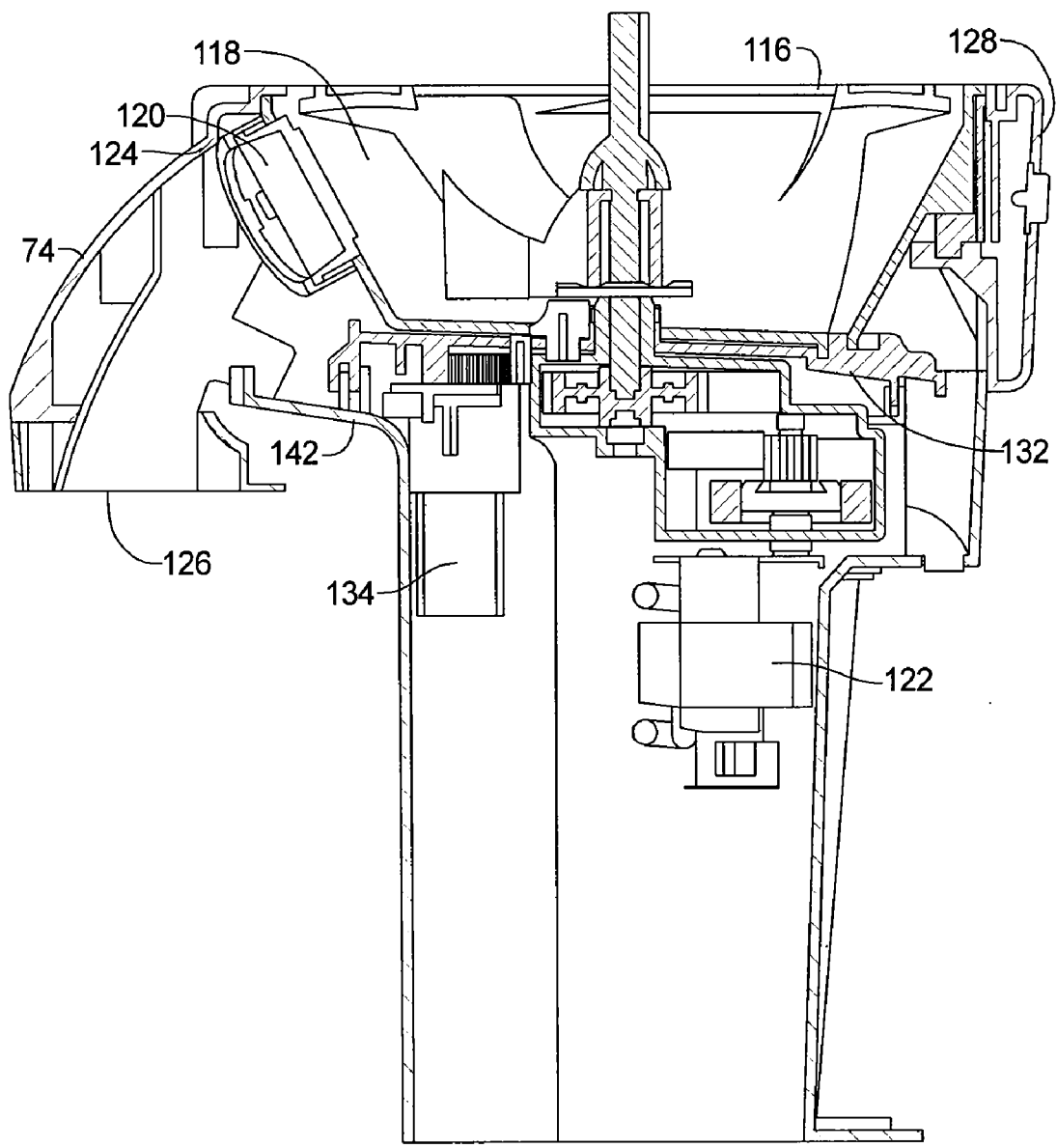
FIG. 12 depicts a side cross sectional view of the housing portion of the frozen drink maker of FIG. 5.

Referring to FIGS. 11 and 12, the ice container 70 and cover 72 have been removed in order to view the ice paddle 116 of the ice-shaving unit 68. The ice paddle 116 is located in an ice hopper 118, where the shaver blade 120 is mounted to and extends partially through an opening in the frustoconical surface of the ice hopper 118. The ice paddle 116 is operably connected to a drive motor 122 to rotate the ice paddle 116 within and with respect to the ice hopper 118. The rotation of the ice paddle 116 pushes the ice cubes or crushed ice within the ice hopper 118 against the shaver blade 120, causing the ice to be finely shaved.

The shaved ice is delivered into a blender jar through the moveable ice chute 74, where a first end 124 of the ice chute 74 is positioned adjacent to the shaver blade 120 and a second end 126 of the ice chute 74 is positioned proximal to an opening in a lid of a blender jar. The ice paddle 116 pushes the ice cubes into contact with shaver blade 120 producing ice shavings which, directed by ice chute 74, drop into the blender jar.

Referring to FIG. 5, the ice chute 74 is affixed to an outer ring 128 rotatable positioned about an upper portion of the housing 42. The outer ring 128 is rotatable with respect to the housing in a clockwise or counter clockwise direction in response to the controller. The rotation of the outer ring 128 moves the ice chute 74 from one blender jar to the other, positioning the ice chute 74 for the deposit of shaved ice in a blender jar.

Figure 13:
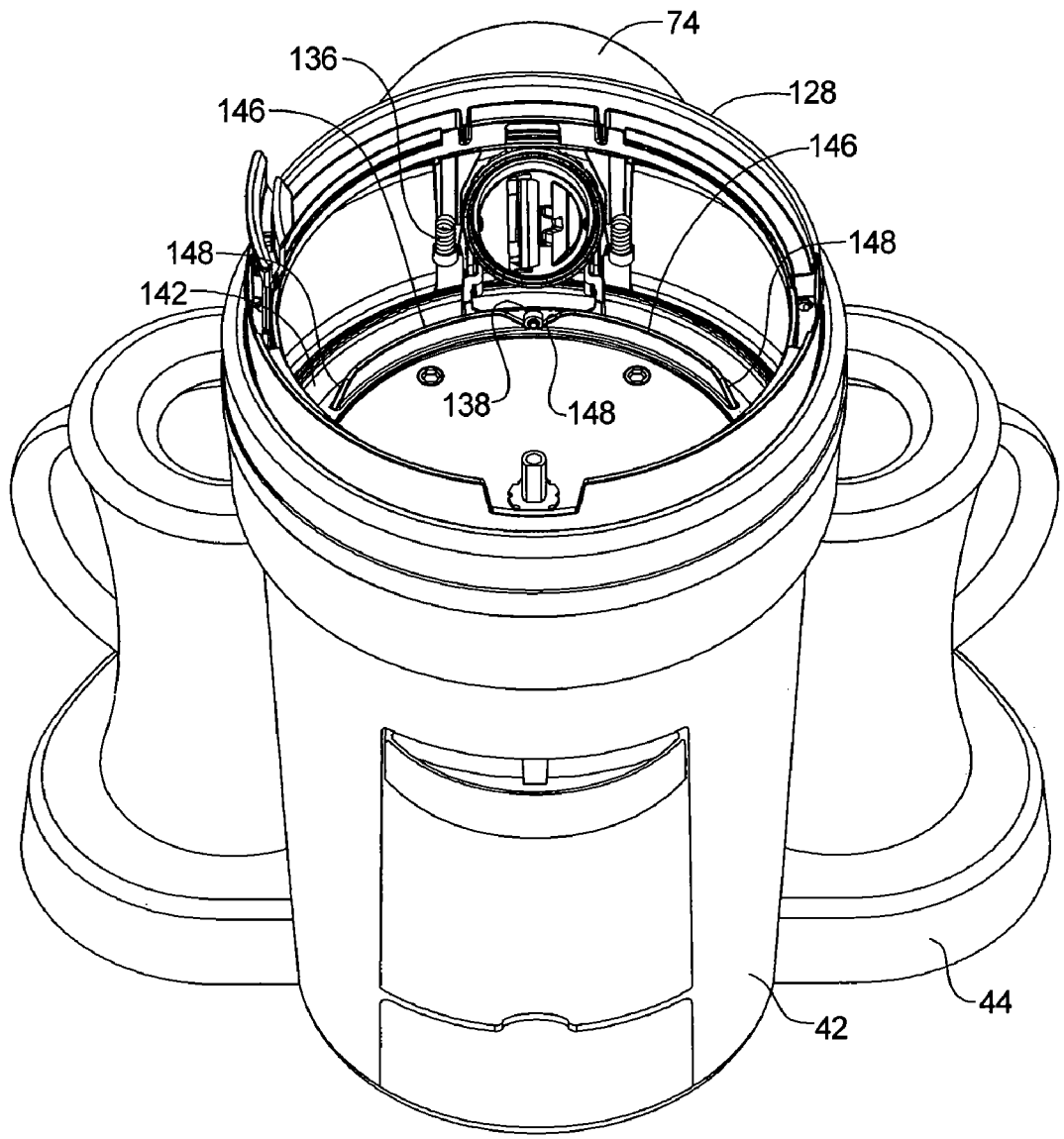
FIG. 13 depicts a tops sectional view of the frozen drink maker of FIG. 5 rotation mechanism for the ice chute.
Figure 14:
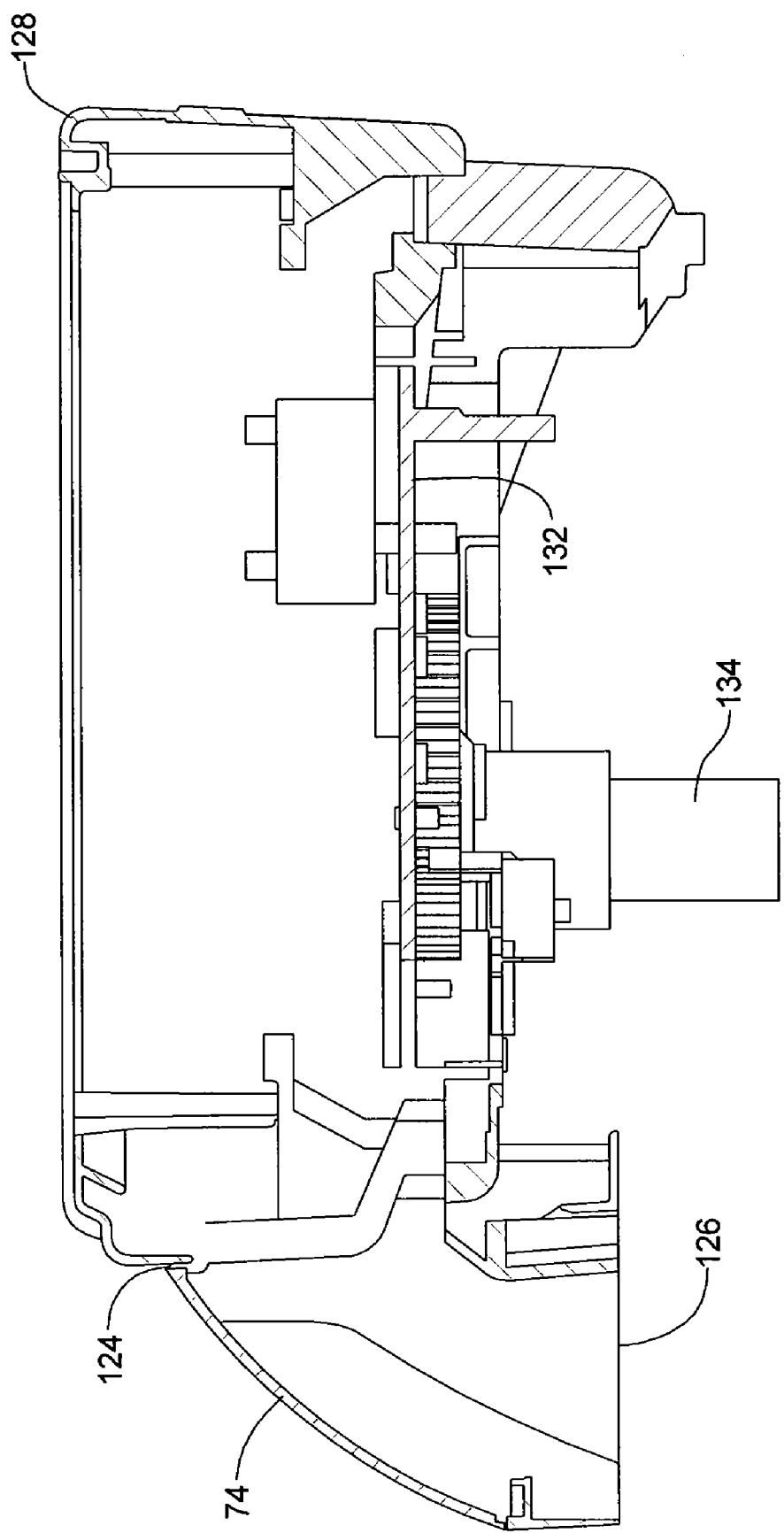
FIG. 14 depicts a side cross sectional view of the ice chute rotation mechanism.

Referring to FIGS. 13-14, the outer ring 128 is connected to a base plate 132 rotatable mounted in the housing 42, such that a rotation of the base plate 132 rotates the outer ring 128. A drive motor 134, mounted in the housing 42, is operably connected to the base plate 132 for driving the rotation thereof. The drive motor 134 is bi-directions, such that the base plate 132 can be rotated in either the clockwise or counter clock-wise directions. The operable connection of the drive motor 134 to the base plate 132 can be an indirect connection utilized gear, belts, or combinations thereof. Alternatively, the operable connection of the drive motor 134 to the base plate 132 can be a direct connection.

The ice hopper 118 is connected to the base plate 132, such that ice hopper 118 rotates in unison with the base plate 132. In this manner, the shaving blade 120 rotates with and remains aligned with the ice chute 74 as the ice chute 74 is rotated from blender jar to blender jar.

The ice chute 74 can be sliding mounted to the outer ring 128, such that the ice chute 74 is vertically raised and lowered as the ice chute 74 is rotated from blender jar to blender jar. The ice chute 74 is vertically slidingly mounted to the outer ring 128, where the ice chute 74 is movable between an upper and lower position. A bias member 136 is position between the ice chute 74 and the outer ring 128, biasing the ice chute 74 in a lower position. The ice chute 74 further includes a roller bearing 138 positioned on a guide rail 140 located on an inner horizontal surface 142 of the upper portion 144 of the housing 42. The guide rail 140 is made up of raised portions 146 and lower portions 148, where a lower portion 148 of the guide rail 140 is aligned with each of the blender jars 52, 54, 56. When the roller bearing 138 is positioned in a lower portion 148 of the guide rail 140, the ice chute 74 is in the lower position. Alternatively, when the roller bearing 138 is positioned on an upper portion 146 of the guide rail the ice chute 74 is in the raised position.

In an exemplary use, from an initial rest positioned with the ice chute 74 aligned with the center, second, blender jar 54, the roller bearing 138 is positioned in the center lower portion 148 of the guide rail 140. As the outer ring 128 is rotated in the clockwise direction, the roller bearing 138 travels along the raised portion 146 of the guide rail 138, moving the ice chute 74 into the upper position. In the upper position, the second end 126 of the ice chute 74 is raised above and separated from the top surface of the blender jar lid. Upon reaching the first blender jar 52, the roller bearing 138 moves into a lower portion 148 of the guide rail 140 aligned with the first blender jar 52, lowering the ice chute 74 into the lower position. In the lower position, the second end 126 of the ice chute 74 is positioned proximal to the top surface of the blender jar lid.

Alternatively, as the outer ring 128 is rotated in the counter-clockwise direction from the rest position, the roller bearing 138 travels to along the raised portion 146 of the guide rail 138, raising the ice chute 74. Upon reaching the third blender jar 56, the roller bearing 138 moves into the lower portion 148 of the guide rail 138 aligned with the third blender jar 56, lowering the ice chute 74. In this manner, the ice chute 74 can be raised as it travels from one blender jar to another, and lowered such that the second end 126 of the ice chute 74 is aligned with and covers the opening in the blender jar lids. As the ice chute 74 is raised as it is rotated, it will not impinge on a lid of a blender jar.

Figure 15:
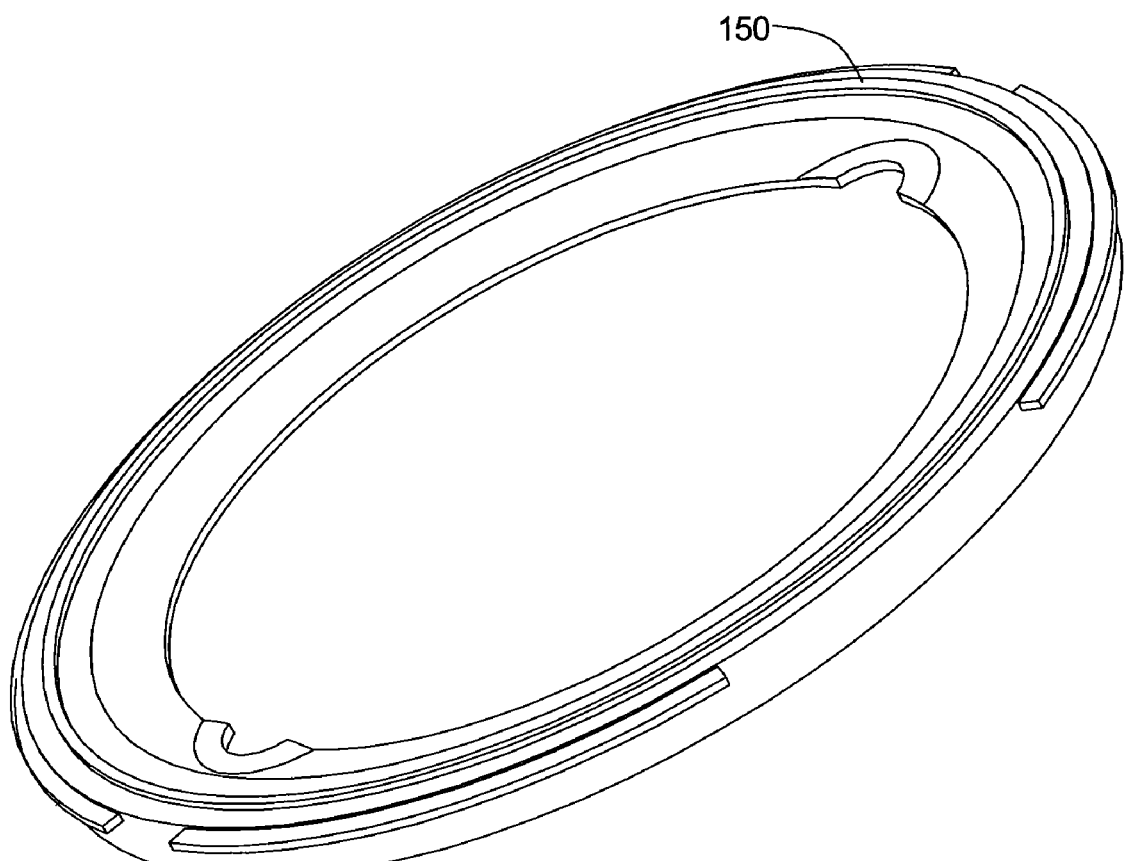
FIG. 15 depicts an isometric view of an ice hopper cover for use with the frozen drink maker of FIG. 5.

Referring to FIG. 15 an ice paddle cover 150 is provided. The ice paddle cover 150 is removable positionable over the top of the ice paddle 116, substantially covering the top circumferential surface 152 of the ice paddle 116. (See FIG. 11). The ice paddle cover 150 substantially prevents the accumulation of ice between the ice paddle 118 and the ice container 70.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A frozen drink maker comprising:
a base and a housing vertically positioned on the base, the housing including an ice shaving unit;
an ice chute positioned on an outer surface of the housing in communication with the ice shaving unit, the ice chute being selectively rotatable about the housing;
a plurality of blender units positioned on the base, radially about the housing, each of the plurality of blender units having a removable blender jar for receiving shaved ice therein, wherein the ice chute is rotatable about the housing to be selectively positioned over each of the blender jars; and
a controller operably connected to the ice shaving unit and each of the plurality of blender units, the controller selectively controlling an operation of the ice shaving unit and each of the plurality of blender units.

2. A frozen drink maker as set forth in claim 1, wherein the controller automatically and selectively rotates the ice chute on the ice shave unit.

3. A frozen drink maker as set forth in claim 2, wherein the controller automatically controls an amount of ice deposited into each of the blender jars and a duration of operation of each of the blender units.

4. A frozen drink maker as set forth in claim 3, wherein the controller is preprogrammed to make a plurality of different frozen drinks.

5. A frozen drink maker as set for in claim 4, wherein the controller can be set to make a different frozen drink in each of the blender jars.

6. A frozen drink maker as set forth in claim 5, further comprising a control panel having a plurality of control knobs to control the operation of the blender units, one each for each of the blender units.

7. A frozen drink maker as set forth in claim 6, wherein each of the control knobs can be independently set to one of the preprogrammed frozen drinks.

8. An apparatus comprising:
a base and a vertical housing positioned on the base, the vertical housing including an ice shaving unit;
an ice chute positioned on an outer surface of the vertical housing in communication with the ice shaving unit, the ice chute being selectively rotatable about the vertical housing;
a programmable controller operably connected to the ice shaving unit for controlling an operation of the ice shaving unit,
wherein the programmable controller automatically and selectively rotates the ice chute radially about the housing and
wherein the vertical height of the ice chute changes as the ice chute is rotated about the vertical housing.

9. An apparatus as set forth in claim 8 further comprising;
a plurality of blender units positioned on the base radially about the vertical housing, each of the plurality of blender units having a blender jar for receiving shaved ice therein; and
wherein the programmable controller is operably connected to each of the plurality of blender units for controlling the operation of each of the plurality of blender units.

10. An apparatus as set forth in claim 9, wherein the programmable controller includes a plurality of preprogrammed routines to make a plurality of different frozen drink, and the programmable controller can be selectively set to make one of the plurality of frozen drink in each of the blender jars.

11. An apparatus as set forth in claim 10, wherein the programmable controller automatically and selectively rotates the ice chute on the ice shaving unit over each of the blender jars.

12. An apparatus as set forth in claim 10, wherein the programmable controller can be selectively set to make the same frozen drink in each of the plurality of blender jars.

13. An apparatus as set forth in claim 12, wherein the programmable controller can be selectively set to make a different frozen drink in at least one of the blender jars.

14. An apparatus as set forth in claim 13, wherein each of the plurality of preprogrammed routines controls the amount of ice deposited into the blender jars and the duration of operation of the blender unit for the respective blender units.

15. A frozen drink maker comprising:
a base and a vertical housing positioned on the base, the vertical housing including an ice shaving unit;
an ice chute positioned on an outer surface of the vertical housing in communication with the ice shaving unit, the ice chute being selectively rotatable about the vertical housing;
a first blender unit positioned on the base proximal to the vertical housing, the first blender unit having a removable first blender jar for receiving shaved ice therein;
a second blender unit positioned on the base proximal to the vertical housing, the second blender unit having a removable second blender jar for receiving shaved ice therein;

a third blender unit positioned on the base proximal to the vertical housing, the third blender unit having a removable third blender jar for receiving shaved ice therein, wherein the first, second, and third blender units are radially positioned about the vertical housing;

a programmable controller operably connected to the ice shaving unit and each of the first, second, and third blender units for controlling an operation of the ice shaving unit and the first, second, and third blender units, the programmable controller including a plurality of preprogrammed routines to make a plurality of different frozen drink, wherein the programmable controller can be selectively set to make one of the plurality of frozen drink in each of the first, second, and third blender jars, and wherein the programmable controller automatically and selectively rotates the ice chute radially about the vertical housing, over each of the first, second, and third blender jars.

16. A frozen drink maker as set forth in claim 15, wherein the programmable controller can be selectively set to make the same frozen drink in each of the plurality of blender jars.

17. A frozen drink maker as set forth in claim 16, wherein the programmable controller can be selectively set to make a different frozen drink in at least one of the blender jars.

* * * * *